(12) United States Patent
Sabry et al.

(10) Patent No.: US 6,973,250 B2
(45) Date of Patent: Dec. 6, 2005

(54) METHOD OF AND APPARATUS FOR MANAGING A LENGTH OF OPTICAL FIBRE

(75) Inventors: Martin Sabry, Cambridge (GB); Dave Lewis, Stratford-upon-Avon (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 10/496,447

(22) PCT Filed: Nov. 11, 2002

(86) PCT No.: PCT/GB02/05072

§ 371 (c)(1),
(2), (4) Date: Nov. 17, 2004

(87) PCT Pub. No.: WO03/046621

PCT Pub. Date: Jun. 5, 2003

(65) Prior Publication Data

US 2005/0063661 A1    Mar. 24, 2005

(30) Foreign Application Priority Data

Nov. 22, 2001 (GB) .................................... 0128032

(51) Int. Cl.⁷ .............................................. G02B 6/00
(52) U.S. Cl. .................... 385/135; 385/111; 385/136
(58) Field of Search ............................... 385/134–136, 385/111

(56) References Cited

U.S. PATENT DOCUMENTS

| | | | | |
|---|---|---|---|---|
| 3,955,878 A | * | 5/1976 | Nowak | ....................... 385/111 |
| 4,379,614 A | | 4/1983 | Liertz | |
| 4,759,602 A | | 7/1988 | Pascher | |

FOREIGN PATENT DOCUMENTS

| | | |
|---|---|---|
| EP | 1 160 603 A1 | 12/2001 |
| FR | 2 738 354 | 3/1997 |
| JP | 57124313 A | 8/1982 |
| JP | 61134706 | 6/1986 |
| JP | 03148605 | 6/1991 |

* cited by examiner

*Primary Examiner*—Frank G. Font
*Assistant Examiner*—Michael P. Mooney
(74) *Attorney, Agent, or Firm*—Kirschstein, et al.

(57) ABSTRACT

A method and apparatus for managing a length of optical fiber by housing the length of optical fiber in a duct, the length of optical fiber being so coiled as to extend along the duct and the length of optical fiber being connected to a plurality of fiber-joining devices positioned along the duct. The fiber-joining devices are contained in modules which are removably attached to the outer periphery of the duct.

10 Claims, 1 Drawing Sheet

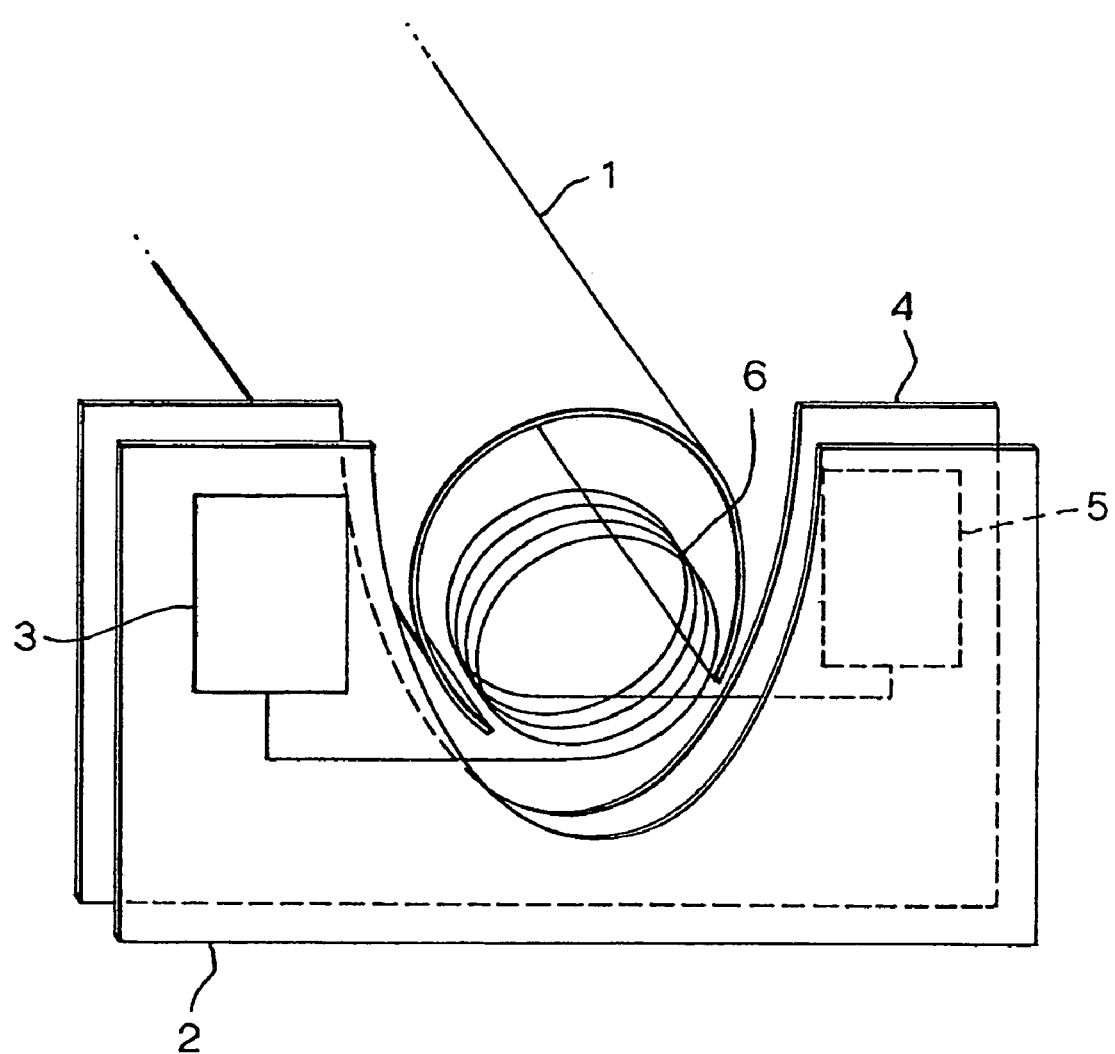

METHOD OF AND APPARATUS FOR MANAGING A LENGTH OF OPTICAL FIBRE

FIELD OF THE INVENTION

The invention relates to a method of and apparatus for managing a length of optical fibre.

BRIEF SUMMARY OF THE INVENTION

The invention provides a method of managing a length of optical fibre including the steps of:
  housing the length of optical fibre in a duct, the length of optical fibre being so coiled as to extend along the duct, the coils of the optical fibre being free to expand, under the natural tendency to straighten, restrained by the inner periphery of the duct,
  providing a plurality of modules removably attached to the outer periphery of the duct at intervals along the duct,
  locating a plurality of devices in the modules, for attachment to the length of optical fibre at a plurality of positions adjacent to the modules and
  connecting the length of optical fibre to selected ones of the devices in the modules.

Preferably, the method includes the step of
providing a length-wise slot in the duct and connecting the length of optical fibre through the slot to selected ones of the devices in the modules.

Preferably, the method includes the step of withdrawing selected devices by detaching the modules containing the selected devices from the duct.

Preferably, the method includes the step of returning the selected devices by attaching the modules containing the selected devices to the duct.

Preferably, the method includes the step of including a plurality of fibre-joining devices in the modules.

The invention also provides an apparatus for managing a length of optical fibre including:
  a coiled length of optical fibre.
  a duct the inner periphery of which is of a size and shape to house the length of optical fibre so coiled as to extend along the duct, the coils of the optical fibre being free to expand, under the natural tendency to straighten, restrained by the inner periphery of the duct,
  a plurality of modules removably attached to the outer periphery of the duct at intervals along the duct and
  a plurality of devices in the modules, for attachment to the length of optical fibre at a plurality of positions adjacent to the modules,
  the length of optical fibre, when housed in the apparatus, being connected to selected ones of the devices.

Preferably, the apparatus includes a length-wise slot in the duct, the length of being connected through the length-wise slot to selected ones of the devices.

Preferably, the inner periphery of the duct is of a size and is so contoured as to allow the coils of the optical fibre to expand to a radius of about the minimum fibre bend-radius required for satisfactory signal transmission.

Preferably, the inner periphery of the duct is cylindrical.

Preferably, the devices in the modules include fibre-joining devices.

BRIEF DESCRIPTION OF THE DRAWING

A method of and apparatus for managing a length of optical fibre will now be described by way of example only with reference to the accompanying drawing.

DETAILED DESCRIPTION OF THE PREFERRED EMBODIMENT

The apparatus includes a cylindrical duct 1 having a length-wise slot making the inner periphery of the cylindrical duct accessible through the slot. A first module 2 is removably attached to the outer periphery of the cylindrical duct 1 and contains a first fibre-joining device 3. A second module 4 is removably attached to the outer periphery of the cylindrical duct 1 and contains a second fibre-joining device 5. A length of optical fibre 6 is housed in the cylindrical duct 1 and is so coiled as to extend along the cylindrical duct 1, the coils of the optical fibre being free to expand, under the natural tendency to straighten, restrained by the inner periphery of the cylindrical duct 1. The first module 2 is spaced from the second module 4 along the cylindrical duct 1 by about the coiled length of the optical fibre 6 which is attached, at one position, to the adjacent first fibre-joining device 3 and, at another position, to the adjacent second fibre-joining device 5.

The specific manner in which the first module 2 and the second module 4 are removably attached to the cylindrical duct 1 is not shown in the drawing but may include ribs on the outer periphery of the cylindrical duct 1 into which the first module 2 and the second module 4 are removably clipped. Other means of removable attachment may also be used.

The optical cable 6 extends through the slot in the cylindrical duct 1 enabling connection to the first and second fibre-joining devices 3 and 5.

The maintenance of the optical fibre 6 requires that the fibre-joining devices 3 and 5 should be accessible for servicing and other purposes. The first fibre-joining device 3 may be removed by withdrawing the first module 2, at which time a part of the length of optical fibre 6 adjacent to the first fibre-joining device 3 is readily pulled from the cylindrical duct 1 because of the coiled lay-up of the optical fibre 6. Similarly, on the return of the fibre-joining device 3, the part of the length of the optical fibre 6 pulled from the cylindrical duct 1 is readily replaced in the cylindrical duct 1 and returns to the coiled lay-up. A corresponding situation exists in relation to the removal and return of the cable-joining device 5.

There is a minimum fibre bend-radius for satisfactory operation of the length of optical fibre 6 and the size and shape of the inner periphery of the duct 1 are so chosen as to permit the coiled length of optical fibre 6 to meet the restrictions on fibre bend-radius. A cylindrical inner periphery for the duct 1 is satisfactory and it will be appreciated that minor departures from truly cylindrical are satisfactory. An inner periphery of oval transverse cross-section for the duct 1 is also satisfactory. Also satisfactory are other transverse cross-sections which permit the coiled length of optical cable to be cylindrical or near-cylindrical.

The width of the slot in the duct 1 in relation to the width of the duct 1 is a matter of the balance between housing the optical fibre 6 effectively and the ease with which an appropriate amount of the optical fibre 6 may be withdrawn with a fibre-joining device 3 or 5.

The slot may be omitted altogether and connection made through the open ends of the duct but the absence of a slot makes the removal of fibre-joining devices more complicated, although such removal is then still possible.

The accompanying drawing shows only modules 2 and 4 and fibre-joining devices 3 and 5 but it will be understood that many more modules and fibre-joining devices may be employed according to the length of the optical fibre 6. Connection of the optical fibre 6 to devices in the modules other than fibre-joining devices is possible.

What is claimed is:

1. A method of managing a length of optical fiber, comprising the steps of:
   a) housing the length of optical fiber in a duct, and coiling the length of optical fiber into coils that extend along the duct, the coils of the optical fiber being free to expand, under a natural tendency to straighten, and being restrained by an inner periphery of the duct;
   b) providing a plurality of modules removably attached to an outer periphery of the duct at intervals along the duct;
   c) locating a plurality of devices in the modules, for attachment to the length of optical fiber at a plurality of positions adjacent to the modules; and
   d) connecting the length of optical fiber to selected ones of the devices in the modules.

2. The method as claimed in claim 1, including the steps of providing a lengthwise slot in the duct, and connecting the length of optical fiber through the slot to selected ones of the devices in the modules.

3. The method as claimed in claim 1, including the step of withdrawing the selected ones of the devices by detecting the modules containing the selected ones of the devices from the duct.

4. The method as claimed in claim 3, including the step of returning the selected ones of the devices by attaching the modules containing the selected ones of the devices to the duct.

5. The method as claimed in claim 1, including the step of including a plurality of fiber-joining devices in the modules.

6. An apparatus for managing optical fiber, comprising:
   a) a coiled length of the optical fiber having coils;
   b) a duct having an inner periphery which is of a size and shape to house the coiled length of optical fiber so as to extend along the duct, the coils of the optical fiber being free to expand, under a natural tendency to straighten, and being restrained by the inner periphery of the duct;
   c) a plurality of modules removably attached to an outer periphery of the duct at intervals along the duct;
   d) a plurality of devices in the modules, for attachment to the length of optical fiber at a plurality of positions adjacent to the modules; and
   e) the length of optical fiber being connected to selected ones of the devices.

7. The apparatus as claimed in claim 6, including a lengthwise slot in the duct, the length of optical fiber being connected through the lengthwise slot to the selected ones of the devices.

8. The apparatus as claimed in claim 6, wherein the size of the inner periphery of the duct is so contoured as to allow the coils of the optical fiber to expand to a radius of about a minimum fiber bend-radius required for satisfactory signal transmission.

9. The apparatus as claimed in claim 8, wherein the inner periphery of the duct is cylindrical.

10. The apparatus as claimed in claim 6, wherein the devices in the modules include fiber-joining devices.

\* \* \* \* \*